US005095219A

United States Patent [19]

Laumann et al.

[11] Patent Number: 5,095,219

[45] Date of Patent: Mar. 10, 1992

[54] METHOD AND ARRANGEMENT FOR CONTROLLING THE CUTTING OF WEBS OF MATERIAL TO THE CORRECT DESIGN LENGTH

[75] Inventors: Werner Laumann, Forth-Eckental; Thomas Schmidt, Neustadt a.d. Waldnaab, both of Fed. Rep. of Germany

[73] Assignee: BHS-Bayerische Berg -,Hütten- und Salzwerke AG, München, Fed. Rep. of Germany

[21] Appl. No.: 531,351

[22] Filed: May 31, 1990

[30] Foreign Application Priority Data

Jun. 8, 1989 [DE] Fed. Rep. of Germany ....... 3918665

[51] Int. Cl.$^5$ ...................... G01N 21/86; G06K 15/00

[52] U.S. Cl. .................................... 250/548; 250/557

[58] Field of Search ...................... 250/548, 560, 557; 356/429; 235/566

[56] References Cited

U.S. PATENT DOCUMENTS

| | | | |
|---|---|---|---|
| 3,919,560 | 11/1975 | Nopper | 250/557 |
| 4,176,944 | 12/1979 | Payrhammer | 250/557 |
| 4,600,841 | 7/1986 | Tokuno et al. | 250/548 |
| 4,857,745 | 8/1989 | Gough | 250/557 |
| 4,877,323 | 10/1989 | Stillwagon | 356/430 |

FOREIGN PATENT DOCUMENTS

| | | |
|---|---|---|
| 2747022C2 | 4/1979 | Fed. Rep. of Germany . |
| 2749174A1 | 5/1979 | Fed. Rep. of Germany . |
| 2939955C3 | 4/1980 | Fed. Rep. of Germany . |
| 3006344A1 | 8/1980 | Fed. Rep. of Germany . |
| 3325226A1 | 1/1985 | Fed. Rep. of Germany . |
| 3546480A1 | 10/1986 | Fed. Rep. of Germany . |
| 3542923A1 | 6/1987 | Fed. Rep. of Germany . |
| 2081922 | 12/1971 | France . |

*Primary Examiner*—David C. Nelms
*Assistant Examiner*—S. Allen
*Attorney, Agent, or Firm*—Browdy and Neimark

[57] ABSTRACT

For the control of a cutting to the correct design length, particularly to the correct print image, of continuously conveyed webs of material by means of a cutter unit, the web of material is provided with a bar code which is detected in contactless manner at least for measuring speed and acceleration by means of a sensor. Each bar of the bar code is converted into a signal which may be multiplied in a signal conversion unit. By this means a high degree of precision of the cutting position is obtained.

6 Claims, 1 Drawing Sheet

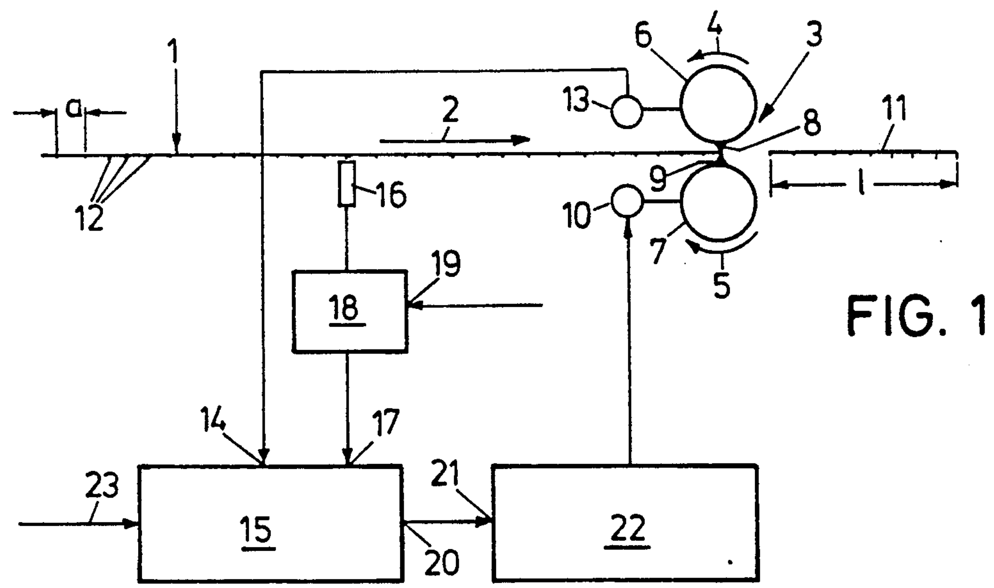
FIG. 1
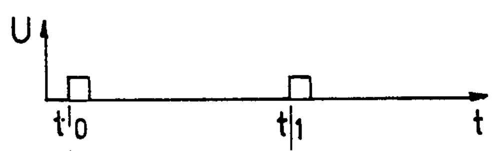
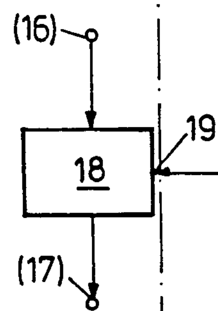
FIG. 2
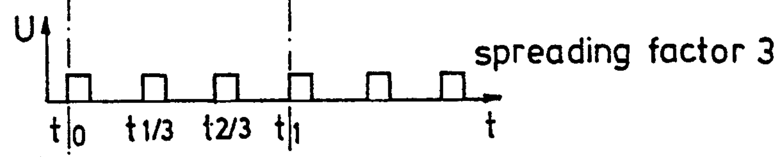
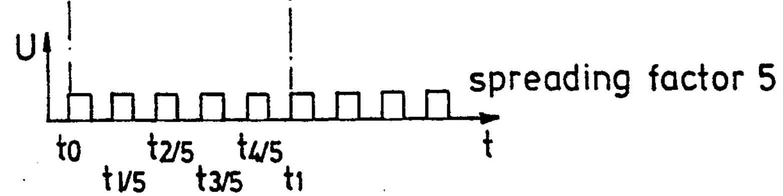

METHOD AND ARRANGEMENT FOR CONTROLLING THE CUTTING OF WEBS OF MATERIAL TO THE CORRECT DESIGN LENGTH

FIELD OF THE INVENTION

The invention relates to a method for controlling the cutting to a correct design length of continuously conveyed webs of material provided with print images of predetermined design length by means of a cutter unit drivable by means of a drive and provided with at least one cutter blade, in which method, before cutting, the position of the cutter blade and the speed and acceleration of the web of material, and in each instance a design length are continuously measured and used for the control of the drive of the cutter unit. Furthermore, the invention relates to an arrangement for carrying out a method for controlling the cutting to a correct design length of continuously conveyed webs of material provided with print images of predetermined design length and provided with a bar code consisting of bars, comprising a cutter unit provided with at least one cutter blade, a drive for driving the cutter unit, a measuring sensor for continuously measuring the position of the cutter blade, a device for measuring the speed and acceleration of the web of material, and a regulating and control unit for regulating the drive depending upon values measured by the measuring sensor and the said device.

BACKGROUND OF THE INVENTION

In a known arrangement of this type the kinematic magnitudes of the web of material, such as displacement, speed and acceleration are detected by means of a measuring wheel rotating on the web of material. By means of this measuring wheel the detection is effected of analogue or digital signals corresponding to specific travel distances of the web of material, which are therefore proportional to the speed of the web of material, as a result of which, again, accelerations can be determined by the comparison of adjacent signals. Furthermore, a photosensor is provided which, on the printing of the web of material with print images, detects printed so-called registration marks, a registration mark being in each instance in a quite definite association with a print image. This photosensor therefore emits a signal which reproduces the position of the image at a particular point in time when actually the registration mark passes the sensor. The kinematic magnitudes detected by means of the measuring wheel are necessary in order to allow the effect to be felt of the displacement, the web speed and also speed changes which occur during the time from the detection of the registration mark to the cutting process. The detection of the kinematic magnitudes by means of a measuring wheel involves drawbacks, as the measuring wheel has mass inertia and, therefore, particularly on the accelerations of the web of material, produces errors. Furthermore, there occur errors of measurement by the measuring wheel as a consequence of diameter variations resulting from temperature fluctuations. In addition errors of measurement occur as a result of a slip between measuring wheel and web of material. To keep the slip as small as possible the measuring wheel must press the web of material with a specific application pressure, which again leads to compressions of the web of material which can detrimentally affect its appearance. In this connection it is also possible that surface structures of the measuring wheel, such as a knurling provided for reducing the slip, will be transferred to the web of material, damaging the latter. As a rule, the kinematic magnitudes are detected by the measuring wheel on the side of the web of material facing away from the print image; however, it is essential that the side of the web of material which has the print images should be cut exactly to the correct position, and thus in exact register. Furthermore, the measuring system integrated into the measuring wheel determines with its resolution power the achievable cutting length accuracy. These numerous drawbacks of the measuring wheel are countered by the fact that the generically pre-established overall process has given a good account of itself in practice.

SUMMARY OF THE INVENTION

The object of the invention is to provide a method of the generic kind and an arrangement of the generic type by means of which a very precise control of cutting to the correct print image length is achieved without damage to the web of material.

This object is achieved according to the invention following a method of the generic type, when the web of material is provided with a bar code which is detected in contactless manner for measuring of speed and acceleration, each bar of the bar code being converted into a signal. In the arrangement of the generic type it is achieved when the device is a sensor scanning in contactless manner the bar code on the web of material. It is essential that all the kinematic magnitudes of the running web of material, i.e. displacement, speed and accelerations should be detected in contactless manner. The exact place on the web of material is constantly detected, as a result of which, again, an accurate cutting to the correct design length is possible. By cutting to the correct design length there is understood on the one hand a cutting to the correct print image, when actually the web of material has been printed with print images. On the other hand, there is understood by this concept a cutting exactly to a predetermined cutting position. The method of the invention as well as the arrangement of the invention can thus be primarily used for the cutting of printed webs of material, but also for the precise cutting of unprinted webs of material.

When between two adjacent signals and corresponding to a predetermined whole number spreading factor, a whole number of signals are produced at equidistant time intervals, which is achieved by a signal conversion unit mounted between the sensor and the regulation and control unit, almost any desired increase of accuracy is achieved, as from two adjacent signals produced by bars of the bar code it is possible to obtain quite a number of signals situated respectively at the same time intervals between them. It is thus possible to effect a multiplication of the signals. Thereby, an increase of precision with respect to the positioning of the cutting is possible down to the range of millimeters. The cutting length accuracy is per se directly proportional to the distance between adjacent bars of the bar code, and, as stated, by spreading, a further considerable increase of precision is possible. The already mentioned registration marks usually provided may be additionally provided; however, it is also possible to dispense with them, as also the exact positioning of the print image and therefore of the cutting point can be taken from, or associated with, the bar code.

Further details of the invention will be found in the following description of an example of embodiment on the basis of the drawings.

BRIEF DESCRIPTION OF THE DRAWINGS

FIG. 1 is a diagrammatic representation of an arrangement for controlling the cutting unit for a continuously conveyed web of material, and FIG. 2 shows in diagrammatic representation a spreading of the signals produced in the arrangement of FIG. 1 on scanning a bar code of the web of material.

DESCRIPTION OF THE PREFERRED EMBODIMENT

A web of material 1 printed in a printing unit with print images (also not shown) moves in the direction of conveying 2 towards a cutting unit 3, a so-called cross-cutter. This cutting unit 3 consists in normal manner of two blade drums 6, 7 which may be driven in opposite directions correspondingly to the rotational direction arrows 4, 5. Of these drums, one is fitted with a cutting blade 8 and the other with a counter-blade 9. The synchronous drive of the two blade drums 6, 7 is effected by means of a drive motor 10 in the manner that the direction of rotation correspondingly to the rotational direction arrows 4, 5 at the places directly adjacent to one another is equal to the direction of conveying 2. At this place, in each instance, the cutting blade 8 and the counter-blade 9 come into mutual engagement and cut off a sheet 11 from the web of material 1. Cutting should take place in such a way that it is exactly to registration mark or to design length, i.e. the cutting takes place exactly at a predetermined place relative to the print image.

Applied to one side of the web of material 1 is a bar code which is formed by bars 12 mutually equidistantly disposed on the upper or underside of the web of material. The distance a between adjacent bars 12 of the bar code may be a few millimeters to a few centimeters, e.g., 5 to 50 mm, usually 10 mm. In any event it is by at least two powers of ten smaller than a design length l of a print image not represented. The design length l, and therefore the cutting length, is usually 500 to 5000 mm. On grounds of ease of survey, the number of bars does not correspond to this ratio.

With at least one cutter drum 6 of the cutting unit 3 a measuring sensor 13 is coupled which is designed as a position sensor for the cutter drums 6, 7. Per complete rotation of the cutter drums 6, 7 it delivers a predetermined number of signals to an input 14 of a regulator 15. The bars 12 of the bar code on the web of material 1 are detected by means of a photo-sensor 16. For each bar one or more signals are supplied to an input 17 of the regulator 15. Between the sensor 16 and the input 17 of the regulator 15 a signal-conversion unit 18 is mounted in which the signal transmitted from the sensor 16 to the input 17 can be multiplied, in fact correspondingly to a spreading factor to be inputted via an input 19. This is made clear in FIG. 2.

In FIG. 2 above two voltage signals with voltage U are shown over time t, having been produced by the sensor 16 moving past two bars 12 of the bar code following each other in the conveying direction 2. The first signal is produced at time t0 whereas the second signal is produced at time t1. When the spreading factor 3 has been inputted via the input 19, three signals, that is at time t0, $t\frac{1}{3}$ and $t\frac{2}{3}$, are emitted by the signal conversion unit 18 in the time interval between t0 and t1, these signals being situated at equal time intervals between them. When—as represented in FIG. 2 below—a spreading factor 5 is inputted in the input 19, then, in the time interval between t0 and t1, five signals situated at equal time intervals are supplied to the input 17 at times t0, t1/5, t2/5, t3/5 and t4/5.

The signals inputted via the input 17 into the regulator 15 supply directly the kinematic magnitudes of the web of material 1, namely its speed, acceleration and position. These magnitudes are arrived at from the time interval between two adjacent signals, or from the alterations of the time intervals between adjacent signals and the number of the signals, a predetermined distance a between two adjacent bars 12 being assumed in each instance. The signals inputted at the inputs 14 and 17 into the regulator 15 are compared one with the other and processed as output signals at an output 20 and supplied at an input 21 of a control unit 22 for the drive motor 10 of the cutter unit 3. This control unit 22 controls the drive motor 10. The processing of the signals supplied from the measuring sensor 13 on the one hand, and from sensor 16 on the other hand, to the regulator 15 is effected in the manner that by means of the cutter unit 3 a cutting of the web of material 1 is effected that is absolutely correct to the design length, i.e. to the print image. In this operation fluctuations of the speed of the web of material 1 are also detected. If, additionally, so-called registration marks are provided which are in each instance, on the printing of the images, printed at a distance l of a design length, it will be appropriate for these to have another width in the conveying direction 2 than the bars 12, as a result of which signals of another width are produced so that the latter are again distinguishable from the signals which are produced by the bars 12.

A desired value is inputted to the regulator 15 at an input 23. This is the preliminary inputting of the place of cutting, i.e. the inputting of the so-called cutting position. This may be inputted by hand, or by a computer. Also, however—as already mentioned—it may be inputted via a registration mark. This may be inputted in the manner already mentioned or via a second sensor—not shown in the drawings—which detects a mark inputted additionally to the bar code, or a longer bar which is thus detected on the one hand by the photo-sensor 16 and on the other hand by the additional sensor which, in turn, however, does not detect the normal bars 12 of the bar code which therefore is situated on another web.

The bar code may also be used additionally when webs of material 1 already printed in succession have to be spliced. By splicing there is meant the joining together of webs of material 1 during the production process, to make continuous production possible. In this operation the start of a following web of material is provided with a doubly adhering adhesive strip which is added to the end of the ending, thus preceding, web of material.

With the aid of the bar code, and in fact particularly together with the additional registration marks mentioned, it may be ensured that the end of the preceding web of material coming to its end, and the start of the following web of material, are joined together exactly to the correct design length.

Alternatively, however, it may also be achieved that a splicing that is not correctly to the design length is detected, and that the cutting out to the correct design length, i.e. correct to the registration mark, is effected of a portion lying in the splicing area.

What is claimed is:

1. A method for controlling the cutting to a correct design length of continuously conveyed webs of material, provided with print images of predetermined design length, by means of a cutter unit drivable by means of a drive and provided with at least one cutter blade, in which method, before cutting, the position of the cutter blade and the speed and acceleration of the web of material, and in each instance a design length are continuously measured and used for the control of the drive of the cutter unit, wherein the web of material is provided over its total length with a bar code which has equidistant bars and is detected in contactless manner for measuring of speed and acceleration, each bar of the bar code being converted into a signal.

2. A method according to claim 1, wherein the detection of the bar code is effected by photosensing.

3. A method according to claim 1, wherein between two adjacent signals, and corresponding to a predetermined whole number spreading factor a whole number of signals are produced at equidistant time intervals.

4. An arrangement for carrying out a method for controlling the cutting to a correct design length of continuously conveyed webs of material (1), provided with print images of predetermined design length (l) and provided with a bar code consisting of bars (12), comprising:

- a cutter unit (3) provided with at least one cutter blade (8);
- a drive (10) for driving the cutter unit (3);
- a measuring sensor (13) for continuously measuring the position of the cutter blade (8);
- a device for measuring the speed and acceleration of the web of material (1); and
- a regulating and control unit (15, 22) for regulating the drive (10) depending upon values measured by the measuring sensor (13) and the said device, wherein the said device is a sensor scanning in contactless manner the said bar code on the web of material (1).

5. An arrangement according to claim 4, wherein the sensor is a photo-sensor (16).

6. An arrangement according to claim 4, wherein a signal conversion unit (18) is mounted between the sensor (16) and the regulation and control unit (15, 22).

* * * * *